(12) United States Patent
Mekenkamp et al.

(10) Patent No.: US 8,537,231 B2
(45) Date of Patent: Sep. 17, 2013

(54) USER INTERFACE SYSTEM BASED ON POINTING DEVICE

(75) Inventors: Gerhardus Engbertus Mekenkamp, Eindhoven (NL); Tim Dekker, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 829 days.

(21) Appl. No.: 12/482,864

(22) Filed: Jun. 11, 2009

(65) Prior Publication Data

US 2009/0251559 A1    Oct. 8, 2009

Related U.S. Application Data

(62) Division of application No. 10/535,464, filed on May 17, 2005, now Pat. No. 7,940,986.

(30) Foreign Application Priority Data

Nov. 20, 2002    (EP) ..................................... 02079816

(51) Int. Cl.
*H04N 5/228* (2006.01)

(52) U.S. Cl.
USPC ...................................... 348/222.1

(58) Field of Classification Search
USPC ................. 348/222.1; 715/863, 856, 757
See application file for complete search history.

(56) References Cited

U.S. PATENT DOCUMENTS

| | | | |
|---|---|---|---|
| 4,576,481 A * | 3/1986 | Hansen | ........................ 356/620 |
| 4,963,017 A | 10/1990 | Schneiter | |
| 5,016,107 A | 5/1991 | Sasson | |
| 5,045,843 A | 9/1991 | Hansen | |
| 5,454,043 A | 9/1995 | Freeman | |
| 5,646,608 A | 7/1997 | Shintani | |
| 5,682,196 A * | 10/1997 | Freeman | ........................ 725/139 |
| 5,719,622 A | 2/1998 | Conway | |
| 5,926,168 A | 7/1999 | Fan | |
| 5,949,351 A * | 9/1999 | Hahm | ........................ 340/4.42 |
| 5,959,539 A | 9/1999 | Adolph | |
| 6,346,933 B1 * | 2/2002 | Lin | ........................ 345/157 |
| 6,489,986 B1 | 12/2002 | Allen | |
| 6,781,623 B1 * | 8/2004 | Thomas | ........................ 348/208.4 |
| 6,850,812 B2 * | 2/2005 | Dinauer et al. | ........................ 700/166 |

(Continued)

FOREIGN PATENT DOCUMENTS

| | | |
|---|---|---|
| DE | 10110979 A1 | 9/2002 |
| EP | 0443419 A2 | 8/1991 |

(Continued)

OTHER PUBLICATIONS

Yachida, Masahiko "Omnidirectional Sensing and Combined Multiple Sensing", CVVRHC, 1998, pp. 1-8.

(Continued)

*Primary Examiner* — Aung S Moe
*Assistant Examiner* — Amy Hsu

(57) ABSTRACT

The user interaction system comprises a portable pointing device (101) connected to a camera (102) and sending pictures to a digital signal processor (120), capable of recognizing an object (130) and a command given by the user (100) by moving the pointing device (101) in a specific way, and controlling an electrical apparatus (110) on the basis of this recognition. (Characteristic) pattern generation means (116) can be included in the system for facilitating object recognition.

23 Claims, 4 Drawing Sheets

(56) References Cited

U.S. PATENT DOCUMENTS

Figure 1:
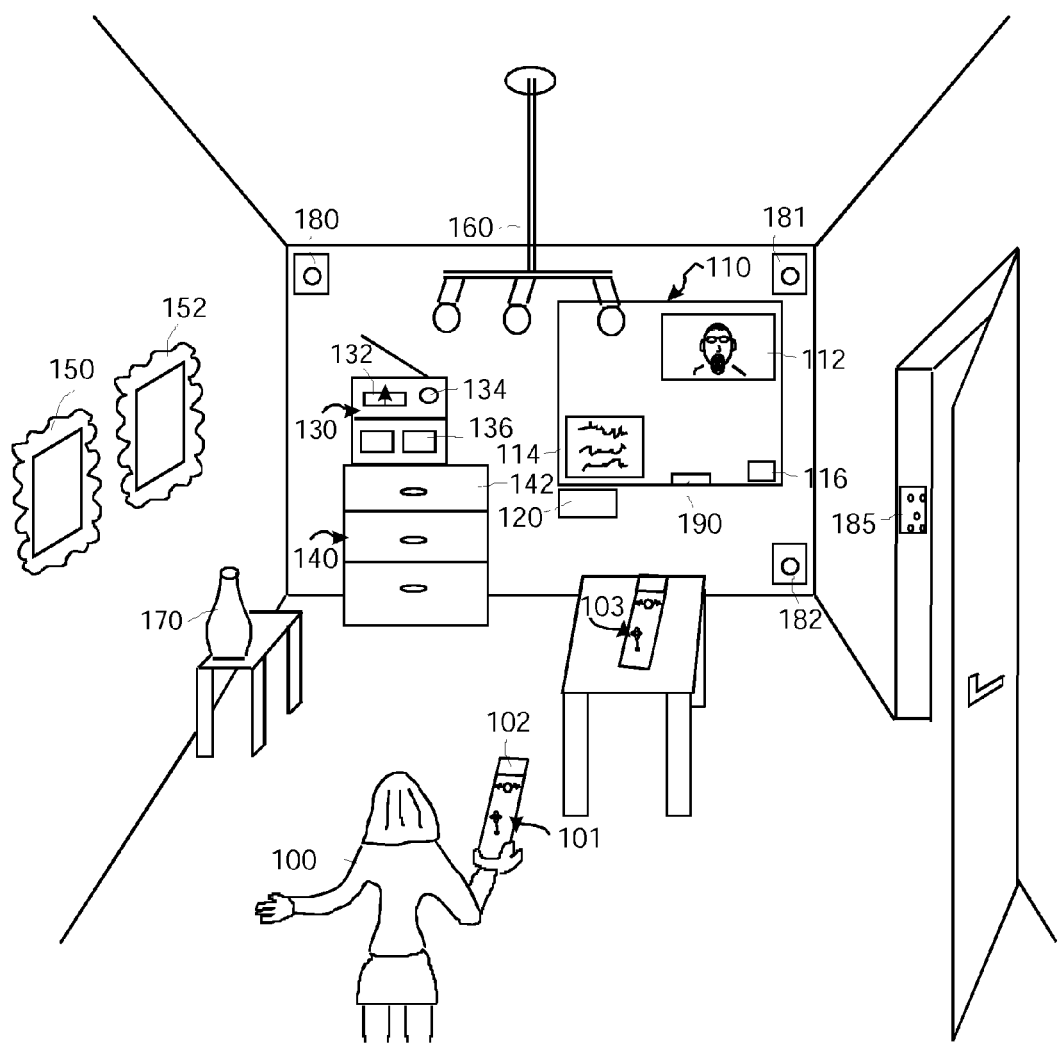

| | | | |
|---|---|---|---|
| 6,967,695 | B2 | 11/2005 | Hoshino |
| 6,982,697 | B2* | 1/2006 | Wilson et al. ............... 345/156 |
| 6,990,639 | B2* | 1/2006 | Wilson ........................ 715/863 |
| 7,028,269 | B1* | 4/2006 | Cohen-Solal et al. ....... 715/863 |
| 7,187,412 | B1* | 3/2007 | Silverstein ............ 348/333.01 |
| 7,432,978 | B2* | 10/2008 | Storm ......................... 348/376 |
| 2001/0030668 | A1* | 10/2001 | Erten et al. ................. 345/863 |
| 2002/0149617 | A1* | 10/2002 | Becker ........................ 345/751 |
| 2003/0081014 | A1* | 5/2003 | Frohlich ..................... 345/856 |
| 2003/0133013 | A1* | 7/2003 | Maeda et al. ............... 348/143 |
| 2003/0156073 | A1* | 8/2003 | Van Zon ...................... 345/1.1 |
| 2004/0048663 | A1 | 3/2004 | Cheng et al. |
| 2004/0247161 | A1* | 12/2004 | Storm ......................... 382/117 |
| 2005/0146622 | A9 | 7/2005 | Silverstein |
| 2005/0259158 | A1* | 11/2005 | Jacob et al. ............... 348/218.1 |
| 2006/0182346 | A1 | 8/2006 | Yoda |

FOREIGN PATENT DOCUMENTS

| | | |
|---|---|---|
| EP | 1130906 A2 | 9/2001 |
| JP | 19950302148 A | 10/1995 |
| JP | 7302148 A1 | 11/1995 |
| JP | 8071252 A | 3/1996 |
| JP | 8331667 A | 12/1996 |
| JP | 2001008279 A | 1/2001 |
| JP | 2001236174 A | 8/2001 |
| JP | 2001243012 A1 | 9/2001 |
| WO | 9935633 A2 | 7/1999 |
| WO | 02052496 A2 | 7/2002 |
| WO | 02059716 A2 | 8/2002 |

OTHER PUBLICATIONS

Dorfmueller, Klaus, "Robust Tracking for Augmented Reality using Retroreflective Markers", Computers & Graphics, vol. 23, 1999, pp. 795-800.

Sukthankar, Rahul et al "Smarter Presentations: Exploiting Nomography in Camera-Projector Systems" Proceedings of International Conf. on Computer Vision, 2001.

Madritsch, Franz, "CCD-Camera Based Optical Tracking for Human-Computer Interaction", Inst. Computer Graphics, Graz Univ. of Technology, 1996.

Seibert, Frank, "Augmenting Reality by Using Uncalibrated Optical Tracking", Computers & Graphics, vol. 23, 1999, pp. 801-804.

Sukthankar, Rahul et al, "Self-Calibrating Camera-Assisted Presentation Interace", Proceedings of International Conf. on Control, Automation, Robotics and Vision, (ICARCV), 2000.

Savidis, Anthony et al "Developing Dual User Interfaces for Integrating Blind and Sighted Users: the HOMER UIMS", Institute of Computer Science, CHI 1995 Proceedings.

McMillan, Grant R. "The Technology and Applications of Gesture-Based Control", Air Force Research Laboratory, Oct. 1998.

Davison, Andrew J. et al., "The Active Camera as a Projective Pointing Device", GRANT GR/J65372 from the EPSRC. pp. 453-462, 1995.

Sweetser, John et al "Absolute Pointing and Tracking Based Remote Control for Interactive User Experience", ThinkOptics, Inc. Mar. 1998.

Matsushita, Hobuyuki et al "ID Cam: A Smart Camera for Scene Capturing and ID Recognition", Interaction Laboratory, Sony Computer Science Laboratories, Inc. 2001.

JAI-M1000K Series Operation Manual, Jan. 2001.

Sabe, Kohtaro et al "Analysis on Real Time Motion Estimation with Active Stereo Camers", AMC, Mar. 1996, pp. 365-370.

Takahashi, Yoshihiko et al "Human Interface using PC Display with Head Pointing Device for Eating Assist Robot and Emotional Evaluation by GSR Sensor", Proceedings of the 2001 IEEE International Conf. on Robotics & Automation, pp. 3674-3679.

Auer, Thomas et al "The Integration of Optical and Magnetic Tracking for Multi-User Augmented Reality", Computers & Graphics, vol. 23, 1999, pp. 805-808.

* cited by examiner

USER INTERFACE SYSTEM BASED ON POINTING DEVICE

The invention relates to a user interaction system, comprising:
an electrical apparatus;
a portable pointing device operable by a user for pointing to a region in space;
a camera taking a picture; and
a digital signal processor, capable of receiving and processing the picture, and capable of transmitting user interface information derived from the picture to the electrical apparatus wherein the camera is connected to the pointing device so that in operation it images the region pointed to.

The invention also relates to a pointing device for use in a user interaction system.

The invention also relates to an electrical apparatus for use in the above mentioned user interaction system.

Such a system is known from D1 (DE10110979A1). D1 relates to an arrangement that has a camera that can recognize objects by taking a sample picture of it and by comparing this picture with a reference. Once an object has been recognized the arrangement can send control codes (such as conventional Remote Control codes) to equipment, associated with the recognized object, to be controlled. A user can be given feedback, by the arrangement, upon object recognition (light, audio, haptic). The inventor realized that it is a disadvantage of D1 that its recognition of an object is solely dependent on the object as is found in real life. The capability of the system of D1 to recognize an object may therefore be poor.

Such a system is partly also known from US-A-2001/0030668. This document describes a universal remote control system in which a user marks a location on a display with a pointing device displaying a recognizable characteristic, e.g. a laser pointer emitting a red spot, and a camera takes a picture of the display and calculates to which location the user has pointed. An electrical apparatus, e.g. a computer or a television, then performs an action corresponding to the marking by the user. E.g. if an icon on the display is marked by flashing the laser pointer twice, a corresponding computer program is started.

It is a disadvantage of the known system that the system is tailored for a particular display. E.g. the display may be a projection from an LCD based front projector on a screen, to which projector a laptop is connected. The camera in the known system has such a position and viewing angle that it is capable of imaging the screen. Next, the DSP is trained to discriminate an area in pictures from the camera, which corresponds to the location of the screen. In the prior art this can be done in a simple way. First a picture of the screen is captured both with and without illumination with a picture from the projector. By comparing the difference of those two pictures, the area of the display in space as viewed by the camera is obtained. Second a perspective transformation is derived which determines the relation between a location pointed to on the display and a location in the picture for projection, in the frame buffer of the laptop. The known document also describes pointing to a virtual display, e.g. a wall, by first manually selecting the corners of the virtual display. However the system is always calibrated for one display and in case a user wants to interact with another display, he has to set up the system again, or use a second system.

It is a first object of the invention to provide a user interaction system of the kind described in the opening paragraph that improves object identification.

It is a second object of the invention to provide a user interaction system of the kind described in the opening paragraph in which it is relatively easy to interact with a number of available electrical apparatuses, more particularly displays.

It is a third object of the invention to provide a pointing device of the kind described in the opening paragraph which makes interaction with a number of available electrical apparatuses relatively easy.

It is a fourth object of the invention to provide electrical apparatus for use in the above mentioned user interaction system.

The first object is realized in that the system further comprises a pattern creation means to exhibit a characteristic pattern that is created for identification purpose by the pointing device of the pattern creation means associated apparatus.

The second object is realized in that the camera is connected to the pointing device so that in operation it images the region pointed to. A fixed camera only images a certain region of space. It is possible that in the known user interaction system, the user's pointing device, or the object pointed to are not even in the field of view of the fixed camera. It is a major advantage of a pointing device with an attached camera, e.g. on the front end of the pointing device closest to the region pointed to, that the camera is always imaging the region pointed to substantially optimally. The object pointed to is in general the electrical apparatus to which the user interface information, e.g. apparatus control data, is sent, but can be any object present in the room in which the user resides, as long as it can be recognized by the DSP. The apparatus to be controlled is then identified e.g. by pointing to it previously.

In an embodiment the user interface information comprises apparatus control data for controlling operation of the electrical apparatus. There can be many apparatuses present in a living room which e.g. produce sound. Each of these devices has a control for increasing or decreasing the sound volume. By pointing the camera of the pointing device towards a particular apparatus and performing a "volume up" command, e.g. by pressing a button on the pointing device or making a specific movement with the pointing device, the sound volume of the device pointed to will increase. Using a known universal remote control can have as a disadvantage e.g. that an apparatus responds which was not intended by the user, because it uses the same remote control code.

It is advantageous if the digital signal processor comprises an object characterizing means for characterizing an object or part of the object present in the picture of the region imaged by the camera, by providing first object characterizing features to a comprised object identification means for identifying the object, and which object identification means is capable of outputting object identification data from which the user interface information is constructed.

In case different electrical apparatuses are to be controlled, they all have to be recognized automatically. The DSP can be e.g. a generic processor running algorithms for characterizing the apparatus, or it can be an ASIC. Typically the object characterizing means will perform image-processing algorithms on a picture of the apparatus. E.g. the relative dimensions of the apparatus can be calculated and the number and positions of buttons on the apparatus can be analyzed. The object identification means associate with these resulting first object characterizing features a specific apparatus, e.g. from information in an apparatus table. Other information about the apparatus, e.g. "first television produced by company X with serial number Y" may be present, like the apparatus control data that the apparatus understands.

It is also advantageous if the digital signal processor comprises:

motion trajectory estimation means for estimating a motion trajectory of the pointing device and outputting a first motion characterizing signature, a signature being a mathematical abstraction of the motion trajectory; and signature identification means for identifying the first motion characterizing signature and outputting command identification data, which represents a user interaction command, corresponding with the first motion characterizing signature, from which command identification data the user interface information is constructed.

To avoid the need of a large number of buttons on the pointing device for all the different commands that can be sent to all the different apparatuses, and to make the user interaction system more user friendly, it is advantageous if at least some of the apparatus control data is generated on the basis of movements of the pointing device by the user, which pointing device is typically in his hand. The signature of an upwards movement could mean "volume up", but in contrast with a standard remote control, the amount of volume change can according to the invention depend on the brusqueness of the motion. If the user moves his arm up slowly, the volume should e.g. change only slightly and in contrast if he moves his arm up fast, the volume should go up a lot. Determination of the motion of the pointing device can be done on the basis of motion sensing means, e.g. a mass on a deformation sensor, a gyroscope, differential GPS, etc. However since a camera is already present, the motion can also be determined by imaging successive pictures and applying a motion estimation algorithm. Since global motion estimation is simpler than precise motion estimation of multiple objects, the camera can be a simple CMOS based camera or even a two-dimensional array of a small number of light sensitive elements.

It is also advantageous if the digital signal processor comprises identification improvement means, which are capable of further improving a probability that the object represented as object identification data, and user interaction command represented as command identification data, are more reliably identified based on predetermined rules, yielding more reliable user interface information. Since identification of the object and motion signature need not always be perfect, given the variability of conditions in a room, identification improvement means can be incorporated which e.g. apply an artificial intelligence set of rules on the identified object identification data and command identification data, possibly also taking into account the characterizing features first object characterizing features and first motion characterizing signature. E.g., a rule for determining the apparatus pointed to can take into account the room in which the pointing device is present, or the time of the day. E.g. the first thing what a user may typically do if he comes home and picks up the pointing device is to switch on the lights. His intention can be verified by the DSP on the basis of a picture of these lights.

It is further advantageous if the predetermined rules comprise probabilistic calculation of the likelihood of an {object identification data, command identification data}—pair, taking into account at least one of the following a priori known information units {room in which the pointing device resides, previous command issued by user, statistical frequency that a user issues a particular command and time of the day}. E.g. the likeliness of a command can be calculated based upon a statistical profile of which commands a user usually uses, and based upon previously issued commands. Also, the likelihood of an apparatus can be updated based on the room in which the pointing device is present. On Friday at eight o'clock the user might want to watch his favorite television program.

It is also advantageous if the digital signal processor comprises object association means for providing to the object identification means object association data comprising at least one of the data entities being: associated object characterizing features and object related data—, the object association data being derivable from object template data in object memory originating from at least one of the methods:

the object template data is obtained from object training means performing a predetermined calculation on second object characterizing features outputted by object characterizing means; and the object template data is derived from inputted object data.

The user interaction system is much more versatile if, instead of being pre-constructed by the manufacturer for controlling a fixed number of apparatuses, the user can adapt it to his changing environment. E.g. if he buys a new apparatus, he would like this apparatus to be controllable by means of the same system. Also if he buys a calendar, hangs it on the wall, and points to it with his pointing device, he would like an action to occur, e.g. starting up a calendar tool on his p.c. For this object association means are required. The user images a new apparatus, e.g. under a few different angles. A number of image processing algorithms running on the object characterizing means extract features for this object which are stored as an object template, possibly after first calculating invariant apparatus specific features. He then selects with a selection user interface which apparatus corresponds to this object template. This is a so-called training phase of the system. When later the system is used in a so called command phase, for sending apparatus control data to an identified apparatus, the object identification by the object identification means can be aided by means of the data stored in the object association means. E.g. on the basis of the object template data a number of associated object characterizing features, corresponding to what the object characterizing means output as first object characterizing features, can be sent to the object identification means, which then performs a comparison, selecting the correct identified apparatus. These features can also be preloaded in the object identification means. The object association means can also send object related data to the object identification means, comprising at least an identifier of the apparatus, and possibly further data such as supported commands. In an alternative realization, the object association means could also perform the object identification itself, in which case only object related data is sent to the object identification means. To avoid that the user has to input a lot of information through the selection user interface, object related data can also be inputted through an object data input, e.g. directly from an apparatus to be identified and controlled. Via this input, characteristic object template data can also be inputted, e.g. the manufacturer of an apparatus might provide a picture taken under well-controlled imaging conditions.

It is also advantageous if the digital signal processor comprises signature association means for providing to the signature identification means signature association data—comprising at least one of the data entities being: associated signature features and command related data—, the signature association data being derivable from signature template data in signature memory originating from at least one of the methods:

the signature template data is obtained from signature training means performing a predetermined calculation on a second motion characterizing signature outputted by the motion trajectory estimating means; and the command template data is derived from inputted command data.

According to a similar rationale, signature association means can be comprised to enable the training of new motion trajectories applied to the pointing device by the user and characterized as signatures. In these realizations command data is inputted e.g. by an apparatus which provides a menu of its supported commands.

It is also advantageous if the first motion characterizing signature is derived on the basis of successive pictures imaged by the camera at respective instances of time. Since a camera is attached to the pointing device, imaging its every move, and global motion can be estimated by a simple motion estimation algorithm, successively imaged pictures can be used for deriving the intended user interface command.

The second object is realized in that the pointing device comprises a camera and is capable of sending a picture to a DSP. As already described above the user interaction system becomes more versatile with such a pointing device.

An embodiment of the pointing device is characterized in that it is capable of sending a picture to the digital signal processor, which is capable of sending user interface information to an electrical apparatus based on the picture In an embodiment the DSP is comprised in the pointing device. The pointing device can then also operate separate from the user interaction system. E.g. the pointing device can be taken to a supermarket, process imaged pictures and store the corresponding first object characterizing features. Control actions by home apparatuses can then be performed at a later time.

It is advantageous if the pointing device comprises motion sensing means for sensing a motion trajectory of the pointing device. Irrespective of whether the device is used for recognizing objects, it can be used to send apparatus control data corresponding to specific movements by the user. The intended apparatus in such an application of the pointing device could e.g. be fixed or indicated with a button.

It is advantageous if the pointing device comprises a characteristic projector for optically projecting a characteristic pattern towards a region pointed to. It is advantageous if the user gets a feedback of which apparatus or part of an apparatus he is pointing to. Otherwise, if he is not aiming correctly, he might e.g. virtually push the wrong button of the apparatus. One form of feedback could be a small picture on a display of the pointing device which shows the center of the region imaged by the camera. An apparatus or button on an apparatus in the middle of the display is the one intended. Another form of feedback comprises projection of a characteristic pattern, e.g. a white cross, or a laser dot, which illuminates the intended part of an apparatus. More complex patterns such as a two-dimensional grid of lines can aid the DSP in identifying the geometry of the imaged apparatus.

It is advantageous if the pointing device comprises a programmable user interface code generator and a wireless transmitter for transmitting the code to the electrical apparatus. Instead of the DSP sending apparatus control data to the apparatus, e.g. by means of a wireless home network based on Bluetooth, the pointing device itself may directly send the appropriate remote control command, e.g. by means of infrared radiation. The advantage compared to a classical universal remote control is that the DSP automatically identifies the apparatus, from a camera picture, and generates the correct code.

It is advantageous if feedback means are present for feedback of user interface information. E.g. a display is useful. Another feedback can provide some kind of force feedback, e.g. by means of a mass which is moved. This can e.g. simulate tipping against the screen of a TV.

The third object is realized in that interface means are comprised which allow the apparatus to send information about supported commands to a pointing device as claimed in claim 1, based on an "identify supported commands" call of the pointing device to the apparatus. The DSP or part of the functionality of the DSP might also be comprised in the apparatus. The apparatus might also transmit object characterizing features and so on.

Figure 2:
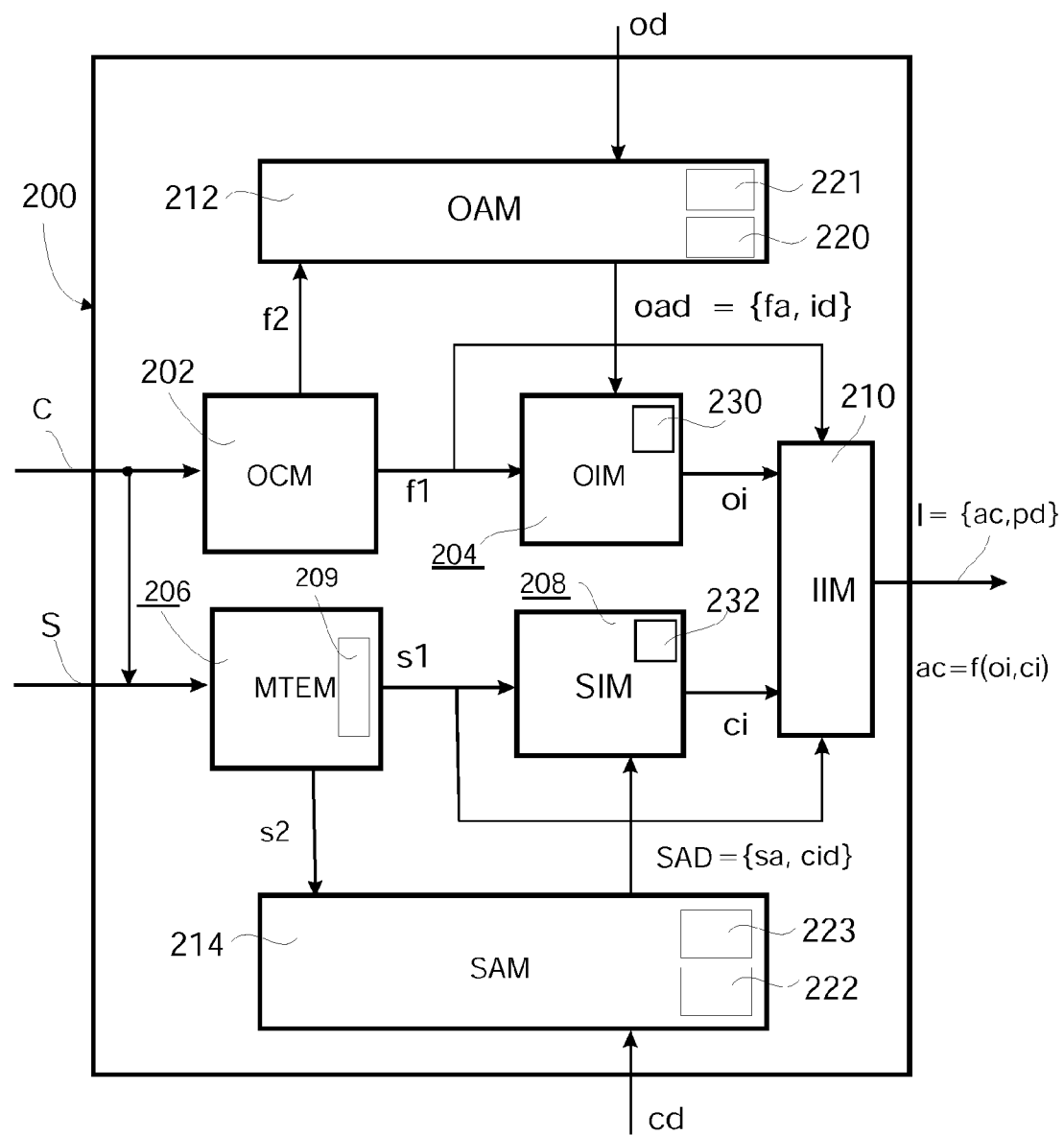
Figure 3:
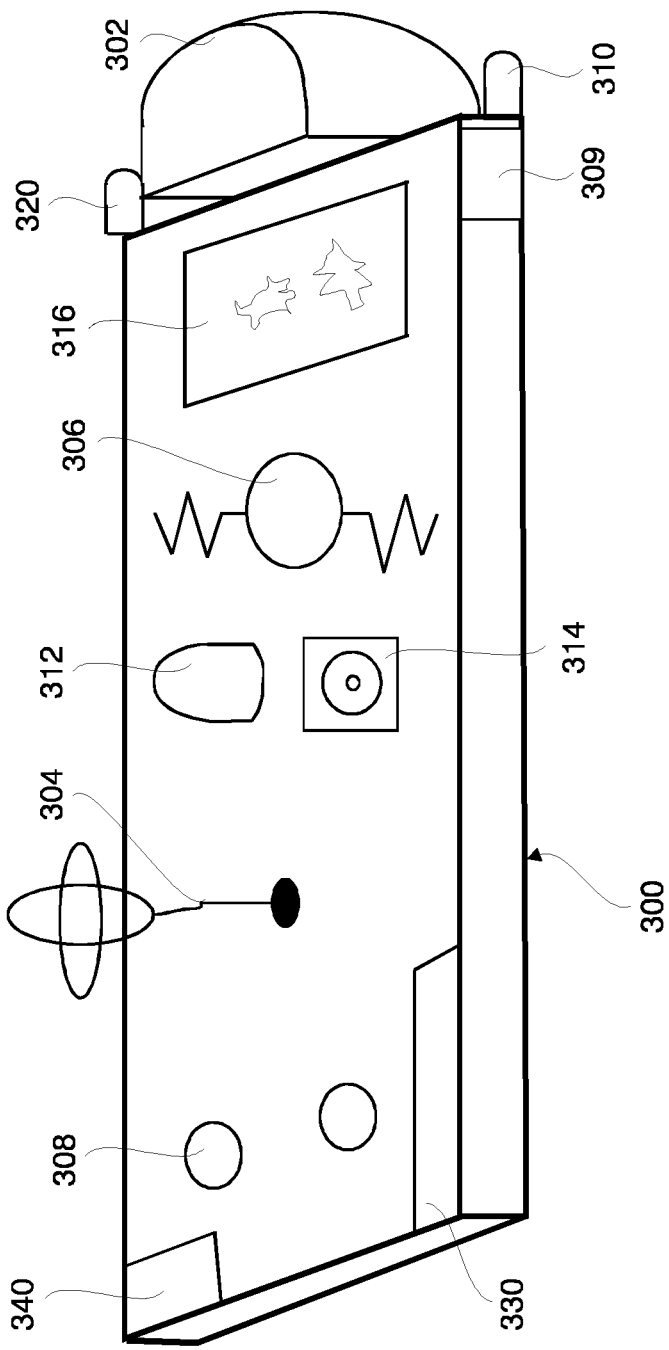
Figure 4A:
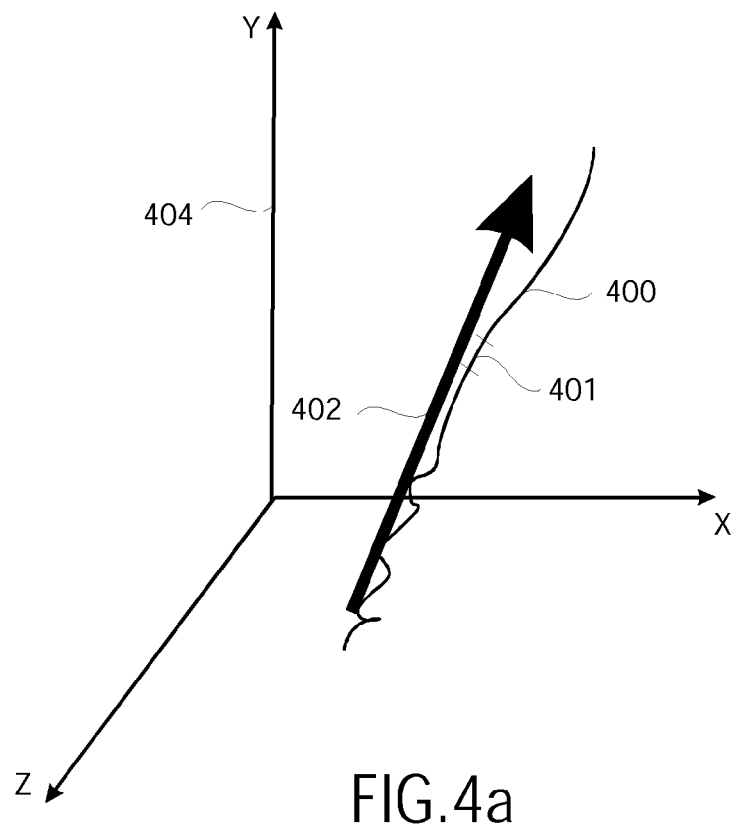
Figure 4B:
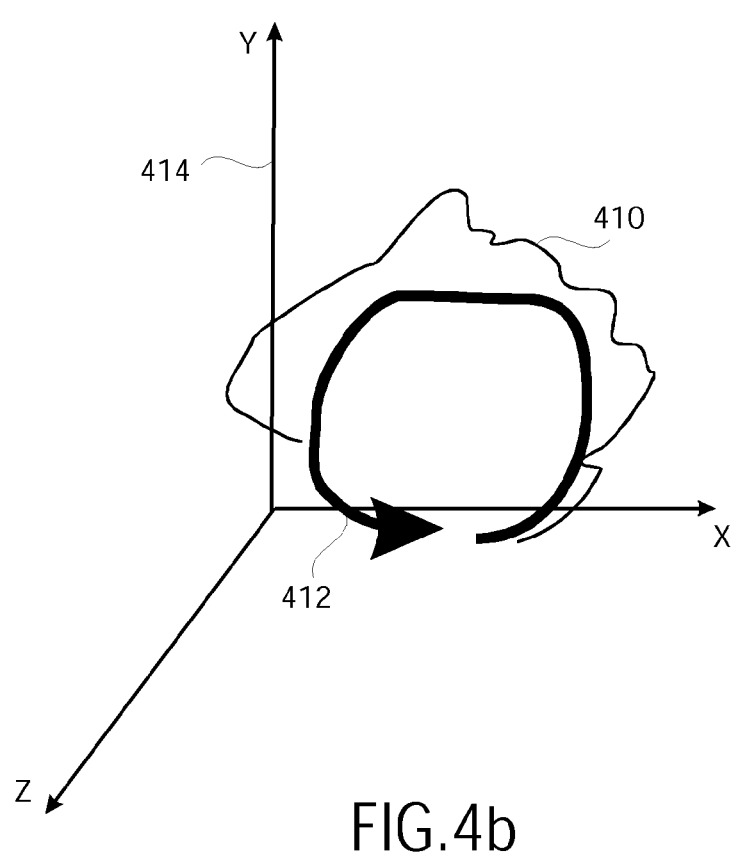

The invention will be apparent from and elucidated with reference to the following description and the accompanying drawing, showing schematically examples of components of the user interaction system and pointing device according to the invention. In this drawing:

FIG. 1 schematically shows a room in which a user interaction system according to the invention is present;

FIG. 2 schematically shows a digital signal processor according to the invention;

FIG. 3 schematically shows a pointing device according to the invention; and FIG. 4 shows two examples of a motion trajectory and corresponding signature.

In FIG. 1 a room is shown containing various electrical apparatuses which can receive user interface information I, e.g. electrical apparatus 110 being a plasma display, but also a personal video recorder or a telephone or a washing machine can be present, with which a user 100 can interact. The room also contains various objects, being electrical apparatuses or just any physical object like e.g. a window, or object 130 being an audio apparatus, vase 170 and electrical apparatus 110, that can be pointed to by means of a pointing device 101.

According to the invention, the pointing device 101 contains a camera 102, and can send pictures of regions of a room or objects in those regions to a digital signal processor (DSP) 120, which can identify the regions or objects on the basis of one or more pictures imaged by the camera 102. The camera is connected to the pointing device 101 in such a way, that it images well the region pointed to. E.g. it can typically reside at the far end of the pointing device 101, but it could also be mounted on the side under an angle. The user 100 has the freedom to point to whatever object he wants, and in such a way a very user-friendly and powerful user interaction system can be realized.

The DSP 120 can be e.g. a home computer controlling apparatuses in a home network, or it can be incorporated in the pointing device 101. The camera 102 can be a CCD camera or CMOS camera. The connection between the camera 102 and the DSP 120 can be wireless if the two are separate. The pointing device 101 can already perform part of the algorithms to be performed by the DSP 120 for identification of an object, so that e.g. only a small set of features need to be sent to the external DSP 120 for further processing. In fact the functionally shown DSP 200 can be distributed in a number of parts in the pointing device 101, room, different apparatuses and so on.

The DSP 120 is designed to send user interface information I, e.g. apparatus control data ac, to an identified apparatus. E.g. user 100 can point the pointing device 101 to light 160 and push an on-button on the pointing device 101, which results in the DSP 120 sending an on-command to the identified light 160. The object identified needs not be the apparatus to be controlled itself. E.g. pointing at vase 170 may start a particular program on a p.c., the output of which is shown on the display apparatus 110. Parts of an object may be pointed to, e.g. pointing at a volume button 134 of object 130 increases or decreases the volume of this audio apparatus, in dependence on an additional action such as the pushing of a button or a movement of the pointing device 101. Pointing to the channel selection display 132 and making a sideward movement may change the channel. The DSP 120 may also recognize the status of a part of an object, e.g. that cassette loader 136 is left open, and issue a "close" command. Other specific situations can also be detected or monitored. User 100 may also point to a piece of furniture 140 or a part 142 thereof. If the piece of furniture 140 is a cupboard different actions can result from pointing to different drawers. If the piece of furniture 140 is an intelligent refrigerator, pointing to it can result in the user defined action of ordering beer over the Internet. Apart from apparatus control data ac, other user interface information I can be sent, e.g. picture data pd. E.g. first electronic painting 150 and second electronic painting 152 display a variable picture. They can be realized with electrophoretic electronic ink displays. User 100 can capture the picture displayed on the first electronic painting, or even a picture on a calendar hanging on the wall, and transfer it as picture data pd to the second electronic painting 152, possibly after some image processing such as e.g. perspective correction.

FIG. 2 schematically shows functional components in a digital signal processor 200—an embodiment of 120 in FIG. 1. Not all components described are necessarily present in a particular embodiment of the user interaction system. The DSP 200 can be realized as a generic processor, an ASIC, or separate components on a circuit board. The DSP 200 may receive camera input c and sensor input s, e.g. from motion sensing means 304. The DSP 200 may comprise an object characterizing unit 202 for characterizing a picture of an object 130 or part of the object 130 as imaged by the camera 102. The object characterizing unit 202 is capable of providing first object characterizing features f1 to an object identification unit 204. The first object characterizing features f1 may be of different kinds depending on the image processing algorithms embodied in the object identification unit 204. Typically the object is first isolated from the remaining parts of the imaged picture. This can be done e.g. on the basis of edge and curve detection on the picture. Another option is 3D analysis of the imaged region, e.g. with a projected grid or a second camera. Part of an object may be detected on the basis of correlation techniques, and then the rest of the object can then be verified.

Second the first object characterizing features f1 are calculated. E.g. a contour of the object and its composing parts can be characterized by means of a curvature versus angle characteristic. Or the ratio width/height may be calculated. Also, the isolated object region itself, or a transformation of it may be used, typically after first performing a perspective correction.

The object identification unit 204 then identifies the object on the basis of the first object characterizing features f1 received from the object characterizing unit 202. E.g. any known classification technique in multidimensional feature space might be used. The output of the object identification unit 204 is object identification data oi, which can be a simple number or a data structure containing additional information about the identified object. The characterizing features and further data of a number of apparatuses might be e.g. stored a priori in an object characteristics memory 230 by the manufacturer of the pointing device containing the DSP 200, or might be preloaded from internet if the DSP 200 is a computer. Instead of identifying an object, the DSP may also identify a region of the room. E.g. pointing the pointing device 101 towards the ceiling may issue the command "lights on", whereas pointing to the floor switches the lights off. Or pointing to one of the corners may invoke an associated command. The corners may be identified on the basis of objects present, e.g. on the left side a plant and on the right side a cupboard.

The user interaction system is much more useful however if a user can train new objects, such as vase 170, himself. Therefore an object association unit 212 might be comprised, which provides the object identification unit 204 with object association data oad. The object association data oad might comprise characterizing features fa of an object, similar to the first object characterizing features f1, based on an object template. The object template can be obtained by applying a training phase. A new object is imaged by the camera 102 under a number of conditions, e.g. different angles, lighting etc. The object characterizing unit 202 generates second object characterizing features f2 for all the pictures. An object training unit 221 in the object association unit 212 generates an object template corresponding to the object which is stored in object memory 220. The template can e.g. be the cluster of second object characterizing features f2 of all the pictures, or average features, or some invariant feature calculated on the basis of the variable second object characterizing features f2. The object template might also be derived by the object training unit 221 on the basis of characterizing features coming in from the outside as object data od. This object data might originate from an apparatus which inputs e.g. pictures of it taken from different angles by a manufacturer. The object data od and object association data oad might also comprise object related data id, i.e. all kinds of information concerning an apparatus, like e.g. supported commands.

To facilitate object recognition, certain objects like e.g. apparatus 110 may display a characteristic pattern 116, e.g. they may flash a red cross a predetermined number of times with different on/off intervals, in response to an "object identify" call of the pointing device. The apparatus 110 might also comprise an interface unit 190, which makes it more useful in a user interaction system according to the invention. E.g. an apparatus like an internet radio can have a "service discovery" function which communicates to the pointing device 101 which commands it supports. It might even transmit infrared remote control sequences corresponding with these commands, and so on. This facilitates the training of the DSP 120, 200 by the user 100. E.g. in response to the communication, the commands can appear as a menu of predefined icons on a display 316 of the pointing device 101. The interface unit 190 can also be realized separately. E.g. a washing machine might not have an intricate remote control facility. A plug-on box can be provided which receives standard commands from the DSP 200 and interfaces in a simple way with the apparatus, e.g. starting it.

The DSP 200 might also comprise components for analyzing gestures made with the pointing device 101 by the user 100. For this, the motion trajectory 400 in FIG. 4 of the pointing device 101 is used, which is calculated e.g. on the basis of pictures from the camera 102. FIG. 4a shows an upward motion trajectory 400 in a three-dimensional coordinate system 404. It is summarized by signature 402 being a mathematical representation of that upward motion trajectory. The signature 402 can be linked, e.g. by means of a command table, with command identification data ci, e.g. in this case the user 100 might reserve this motion for a "volume up" command. A circular motion trajectory 410 and circular signature 412 might mean to one user "rewind", whereas another user has trained the DSP 200 to relate this circular signature 412 with a "device on" command. The user can e.g.

roughly orient his pointing device 101 towards light 160 and make the "device on" motion, on the basis of which the DSP 200 switches the light 160 on. Alternatively the user 100 can also make the "device on" motion somewhere in the air and then point to light 160, or a television or whatever object he wants to be switched on. The signatures 402, 412 can be parameterized in any way and matched by any known curve fitting technique. E.g. the signature 402 can be coded as a number of connected line segments of specific length and intersegment angle.

A motion trajectory estimation unit 206 calculates a motion trajectory 400, on the basis of motion sensing means 304, or successive pictures from the camera 102. E.g. optical flow or block based motion estimation techniques can be applied on two successive pictures to obtain a part 401 of motion trajectory 400. The divergence of the motion vector field can be used to estimate motion towards on object, i.e. typically along an axis of the pointing device 101. On the basis of motion trajectory 400, a signature generation unit 209 outputs a first motion characterizing signature s1. A signature identification unit 208 identifies the first motion characterizing signature s I and link it with command identification data ci, being e.g. a numerical representation of a user interaction command intended by the user 100. The first motion characterizing signature s1 can be compared with signature characteristics for different stored signatures in a signature characteristics memory 232. E.g. if a roughly circular or even any returning movement is made, a stored circular signature template will yield a better match than a linear signature template. Geometrical and structural curve matching techniques can be applied in the similarity calculation.

Just like it is advantageous to have a DSP 200 which is able to learn to identify new objects, it is advantageous if the DSP 200 can identify new movements preferred by the user 100. Therefore the signature association unit 214 might be comprised for providing signature association data SAD to the signature identification unit 208. The signature association data SAD may comprise associated signature features sa, e.g. a mathematical representation of the circular signature 412, and/or command related data cid, e.g. received from an apparatus sending its supported commands as command data cd to the DSP 200. Signature templates in a signature memory 222 can be obtained from a signature training unit 223 on the basis of a first motion characterizing signature s2 from the motion trajectory estimation unit 206 or from command data cd.

Since the environment of the user is very variable, e.g. the lighting changes during the day, the identification of the object 130 or a command, i.e. a signature 402, might sometimes be incorrect. Therefore the DSP 200 might comprise an identification improvement unit 210. The intended command is e.g. dependent on the object 130 pointed to, or might be dependent on the command given previously, and so on. An object is identified incorrectly if it is not present in the room the pointing device is residing in. Therefore room recognizing means 185 may be present, e.g. flashing LEDs. The user 100 can scan the room recognizing means 185 with the pointing device 101 when he enters the room. Apart from the camera 102, a photodiode might be comprised in the pointing device 101 for detecting the room recognizing means 185. Room localization beacons 180, 181, 182 may also be present, so that the DSP 200 can recognize to which part of the room the pointing device 101 is pointing. The beacons could be light emitting in case the camera 102 is to recognize them, but they could also e.g. emit electromagnetic radiation. Objects present in the room can also aid in the recognition of an object. E.g. if vase 170 is next to object 130, its recognition can aid in the recognition of object 130. Even analysis of the past trajectory of the pointing device can be used. If the pointing device was previously pointing to object 130 and it has been moved to the right, it should be pointing to apparatus 110. Taking all this information into account, the identification improvement unit 210 can calculate e.g. Bayesian probabilities or use fuzzy logic to arrive at a more certain identification of the object 130 and the intended command.

The user interaction information I outputted by the DSP 200 typically comprises control apparatus data ac, being e.g. a structure comprising the object identification data oi and the command identification data ci, or a new identifier based on those, identifying an intended command for a particular apparatus 110. The user interaction information I may also comprise picture data pd.

FIG. 3 schematically shows a pointing device 300—an embodiment of 101 in FIG. 1—according to the invention. Not all features shown need be present: a simple pointing device may only comprise a camera 302 and e.g. a display 316 for feedback. A number of buttons e.g. button 308 might be present. This allows for giving certain commands only be pushing a button. Also similar movements of the pointing device 300 can be used for two different commands, once with and once without simultaneously pushing the button 308. A characteristic projector 320 may be present, e.g. for projecting a laser spot towards the location pointed to. The camera of the pointing device is capable of sending a picture to the external DSP 120, but it might also itself comprise the DSP 200. In this way the pointing device can also be used outdoors. A pointing device 103 not carried by the user 100 might also be used to monitor an apparatus 110 or room. Apart from sensing the motion by means of the camera, other motion sensing means 304 may also be comprised, e.g. a gyroscope or differential GPS. A programmable code generator 309 and wireless transmitter 310 may also be present for sending a command directly to an apparatus 110. Feedback means might be present for providing the user with additional information. E.g. a light 312, a sound production device 314, a force feedback means 306, and in particular a display 316 might be comprised. The force feedback means can comprise a small moveable mass, which can simulate vibration or the touching of an apparatus. The display can show e.g. the center of the region pointed to, possibly superimposing a graphically generated cross in the center of the picture imaged. This can also be displayed on a television. Similarly the light 160 might be used to provide feedback instead of light 312. The feedback on the display 316 might show e.g. the motion trajectory 400 and how similar it was to previous motion trajectories during the motion trajectory training phase, aiding the user 100 to learn the DSP 200 to recognize a stable gesture. The display 316 might also indicate what the DSP 200 sees by showing a picture after a number of image processing steps, e.g. a picture containing detected edges, and comprising text naming the identified device.

User identification means 330 might also be present, e.g. a fingerprint sensor, or an input for a password or personal smart card. In this way the DSP 200 can set itself to a mode of operation particular to the user 100. The user might even give different commands depending on the room he is in. Speech recognition means 340 may also be comprised, to supplement the commands given by movements of the pointing device 300. Games could be played by using the pointing device 101 as some kind of interface device to the real world.

The following embodiments give exemplifying combinations of technologies involved in the present invention:
Embodiment 1
  User interaction system, comprising:
    an electrical apparatus;

a portable pointing device operable by a user for pointing to a region in space;
a camera taking a picture; and
a digital signal processor, capable of receiving and processing the picture, and capable of transmitting user interface information derived from the picture to the electrical apparatus,
characterized in that the camera is connected to the pointing device so that in operation it images the region pointed to.

Embodiment 2

User interaction system as in embodiment 1, wherein the user interface information comprises apparatus control data for controlling operation of the electrical apparatus.

Embodiment 3

User interaction system as in embodiment 1, wherein the digital signal processor comprises an object characterizing means for characterizing an object or part of the object present in the picture of the region imaged by the camera, by providing first object characterizing features to a comprised object identification means for identifying the object, and which object identification means is capable of outputting object identification data from which the user interface information is constructed.

Embodiment 4

User interaction system as in embodiment 1, wherein the digital signal processor comprises:
motion trajectory estimation means for estimating a motion trajectory of the pointing device and outputting a first motion characterizing signature, a signature being a mathematical abstraction of the motion trajectory; and
signature identification means for identifying the first motion characterizing signature and outputting command identification data, which represents a user interaction command, corresponding with the first motion characterizing signature, from which command identification data the user interface information is constructed.

Embodiment 5

User interaction system as in embodiments 3 and 4, wherein the digital signal processor comprises identification improvement means, which are capable of further improving a probability that the object represented as object identification data, and user interaction command represented as command identification data, are more reliably identified based on predetermined rules, yielding more reliable user interface information.

Embodiment 6

User interaction system as in embodiment 5, wherein the predetermined rules comprise probabilistic calculation of the likelihood of an {object identification data, command identification data}—pair, taking into account at least one of the following a priori known information units {room in which the pointing device resides, previous command issued by user, statistical frequency that a user issues a particular command and time of the day}.

Embodiment 7

User interaction system as in embodiment 3, wherein the digital signal processor comprises object association means for providing to the object identification means object association data—comprising at least one of the data entities being: associated object characterizing features and object related data—,
the object association data being derivable from object template data in object memory originating from at least one of the methods:

the object template data is obtained from object training means performing a predetermined calculation on second object characterizing features outputted by object characterizing means; and
the object template data is derived from inputted object data.

Embodiment 8

User interaction system as in embodiment 4, wherein the digital signal processor comprises signature association means for providing to the signature identification means signature association data—comprising at least one of the data entities being: associated signature features and command related data—,
the signature association data being derivable from signature template data in signature memory originating from at least one of the methods:

the signature template data is obtained from signature training means performing a predetermined calculation on a second motion characterizing signature outputted by the motion trajectory estimating means; and
the command template data is derived from inputted command data.

Embodiment 9

User interaction system as in embodiment 4, wherein the first motion characterizing signature is derived on the basis of successive pictures imaged by the camera at respective instances of time.

Embodiment 10

Pointing device for use in a user interaction system as in embodiment 1, characterized in that it comprises a camera and is capable of sending a picture to a digital signal processor.

Embodiment 11

Pointing device as in embodiment 10, wherein the pointing device is capable of sending a picture to the digital signal processor, which is capable of sending user interface information to an electrical apparatus based on the picture.

Embodiment 12

Pointing device as in embodiment 10 wherein the digital signal processor is comprised in the pointing device.

Embodiment 13

Pointing device as in embodiment 10, comprising motion sensing means for sensing a motion trajectory of the pointing device.

Embodiment 14

Pointing device as in embodiment 10, comprising a characteristic projector for optically projecting a characteristic pattern towards a region pointed to.

Embodiment 15

Pointing device as in embodiment 10, comprising a programmable user interface code generator and a wireless transmitter for transmitting the code to the electrical apparatus.

Embodiment 16

Pointing device as in embodiment 10 comprising feedback means for feedback of user interface information.

Embodiment 17

Electrical apparatus for use in a user interaction system as in embodiment 1, characterized in that interface means are comprised which allow the electrical apparatus to send information about supported commands to a pointing device as in 1, based on an "identify supported commands" call of the pointing device to the electrical apparatus.

The invention claimed is:
1. User interaction system, comprising:
an electrical apparatus;
a portable pointing device operable by a user for pointing to a region in space;

a camera taking a picture, which camera is physically attached to the pointing device so that in operation it always images the region pointed to without imaging the pointing device;

a distributed digital signal processor, the digital signal processor being capable of receiving and processing the picture, and capable of transmitting user interface information derived from the picture to the electrical apparatus;

at least one localization beacon that emit electromagnetic radiation for use by the digital signal processor in order to recognize where the pointing device is pointing;

wherein the digital signal processor estimates a motion or a motion trajectory of the pointing device; and, wherein said digital signal processor recognizes where the pointing device is pointing without utilizing any electromagnetic radiation emitted from the pointing device itself.

2. User interaction system as claimed in claim 1, wherein the transmitted user interface information includes at least one feature selected from the group consisting of motion speed, and motion direction of the pointing device.

3. User interaction system as claimed in claim 1, wherein the transmitted user interface information includes at least one feature selected from the group consisting of motion trajectory of the pointing device and a characteristic signature derived from the motion trajectory of the pointing device.

4. User interaction system as in claim 1, wherein the user interface information comprises apparatus control data for controlling operation of the electrical apparatus.

5. Electrical apparatus for use in a user interaction system as in claim 1, characterized in that interface means are comprised which allow the electrical apparatus to send information about supported commands to a pointing device based on an "identify supported commands" call of the pointing device to the electrical apparatus.

6. The user interaction system as in claim 1, wherein the motion or the motion trajectory of the pointing device is estimated on basis of motion sensing means.

7. The user interaction system as in claim 1, wherein the motion or the motion trajectory of the pointing device is estimated on basis of successive pictures imaged by the camera at respective instances of time.

8. The user interaction system as in claim 1, wherein the digital signal processor is distributed in a number of parts.

9. The user interaction system as in claim 8, wherein a first part of the digital signal processor is included within the pointing device and a second part of the digital signal processor is included within the electrical apparatus.

10. The user interaction system as in claim 1, wherein the digital signal processor is arranged to analyze gestures made with the pointing device based on said motion trajectory.

11. The user interaction system as in claim 10, wherein the pointing device is arranged to control an operation of the electrical apparatus based on said analyzed gestures.

12. The user interaction system as in claim 1, wherein the motion trajectory is summarized by a signature which is a mathematical representation of said motion. trajectory.

13. The user interaction system as in claim 12, wherein the signature is linked to a command for controlling the electrical apparatus.

14. The user interaction system as in claim 12, wherein the signature is matched by a curve fitting technique.

15. The user interaction system as in claim 1, wherein the pointing device further comprises feedback means for providing a user with feedback of which part of the electrical apparatus the user is pointing to.

16. The user interaction system as in claim 15, wherein said feedback means is selected from the group consisting of light, sound, a display and force feedback means.

17. A method of interacting between an electrical apparatus and a portable pointing device, the device being physically attached to a camera, the method comprising:
 pointing the pointing device to a region in space;
 taking a picture with the camera, wherein the picture is of the region pointed to, and wherein the picture does not contain any image of the pointing device;
 receiving and processing the picture;
 receiving electromagnetic radiation from at least one localization beacon;
 recognizing where the pointing device is pointing by at least in part on utilizing the received electromagnetic radiation;
 transmitting user interface information derived from the picture to the electrical apparatus;
 wherein the processing step comprises estimating a motion ion or a motion trajectory of the pointing device; and,
 wherein the recognizing step does not utilize any electromagnetic radiation emitted from pointing device itself.

18. The method of claim 17 further comprising the step of utilizing a motion sensing means in estimating the motion or the motion trajectory of the pointing device.

19. The method of claim 17 further comprising analyzing successive pictures imaged by the camera at respective instances of time in estimating the motion or the motion trajectory of the pointing device.

20. The method of claim 17 further comprising analyzing gestures made with the pointing device based on said motion trajectory.

21. The method of claim 20 further comprising controlling an operation of the electrical apparatus based on said analyzed gestures.

22. The method of claim 17 further comprising summarizing the motion trajectory by a signature which is a mathematical representation of said motion trajectory.

23. The method of claim 22 further comprising linking the signature to a command for controlling an operation of the electrical apparatus.

* * * * *

UNITED STATES PATENT AND TRADEMARK OFFICE
CERTIFICATE OF CORRECTION

| | |
|---|---|
| PATENT NO. | : 8,537,231 B2 |
| APPLICATION NO. | : 12/482864 |
| DATED | : September 17, 2013 |
| INVENTOR(S) | : Gerhardus Engbertus Mekenkamp et al. |

Page 1 of 1

It is certified that error appears in the above-identified patent and that said Letters Patent is hereby corrected as shown below:

In the Claims

Col. 14, line 32, delete "ion"

Signed and Sealed this
Third Day of June, 2014

Michelle K. Lee
*Deputy Director of the United States Patent and Trademark Office*